United States Patent
Citron

(10) Patent No.: US 7,148,175 B2
(45) Date of Patent: Dec. 12, 2006

(54) CATALYST FOR OLEFIN POLYMERIZATION

(75) Inventor: Joel David Citron, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 168 days.

(21) Appl. No.: 10/498,029

(22) PCT Filed: Jan. 7, 2003

(86) PCT No.: PCT/US03/00328

§ 371 (c)(1), (2), (4) Date: Jun. 7, 2004

(87) PCT Pub. No.: WO03/059511

PCT Pub. Date: Jul. 24, 2003

(65) Prior Publication Data

US 2005/0202960 A1    Sep. 15, 2005

(51) Int. Cl.
| | |
|---|---|
| B01J 31/00 | (2006.01) |
| B01J 37/00 | (2006.01) |
| C08F 4/02 | (2006.01) |
| C08F 4/60 | (2006.01) |
| C08F 4/06 | (2006.01) |
| C08F 4/72 | (2006.01) |

(52) U.S. Cl. ............... 502/117; 502/155; 502/150; 502/167; 502/152; 526/113; 526/118; 526/352

(58) Field of Classification Search ............ 502/117, 502/155, 150, 167, 152; 526/113, 118, 352
See application file for complete search history.

(56) References Cited

U.S. PATENT DOCUMENTS 6,214,761 B1 *   4/2001   Bennett .............. 502/117
6,297,338 B1    10/2001   Cotts et al.

FOREIGN PATENT DOCUMENTS

WO    WO 01/15899    3/2001

* cited by examiner

Primary Examiner—J. A. Lorengo
Assistant Examiner—Jennine Brown

(57) ABSTRACT

A polymerization catalyst system, containing a specified ratio of two iron complexes of a bisimine of 2,6-diacylpyridine or a bisimine of a 2,6-pyridinedicarboxaldehyde which produce polyolefins of differing molecular weights, is useful for producing polyolefins, especially polyethylenes, which are particularly useful for blow molding.

9 Claims, No Drawings

CATALYST FOR OLEFIN POLYMERIZATION

FIELD OF THE INVENTION

A polymerization catalyst system, containing two iron complexes of a bisimine of 2,6-diacylpyridine or a bisimine of a 2,6-pyridinedicarboxaldehyde, produces a mixture of polyolefins of differing molecular weights. This mixture of polyolefins is particularly useful for blow molding.

TECHNICAL BACKGROUND

Polyolefins, including polyethylene, are important items of commerce, being used for many different applications. One of these applications is blow molding, which is particularly useful for making large hollow items such as bottles, drums and tanks from thermoplastics. Blow molding is typically divided into three types of operations: extrusion blow molding, injection blow molding and stretch blow molding. In a typical extrusion blow molding operation, a tube of molten polymer is extruded, and then the open end of the tube is sealed. The sealed tube, called a "parison", is enclosed by a (split) mold, and then the interior of the tube is subjected to gas pressure ("blown") so the it is pressed against the surface of the cool mold, thereby forming a closed shape. The tube end of the shaped article is then cut off and trimmed, and a hollow shaped article results. This method is particularly useful for producing large hollow articles, since the pressures required are low.

In the formation and working of the parison, it is preferred that the molten thermoplastic has certain viscoelastic properties. For formation of the parison by extrusion, it is preferred that the thermoplastic not have too high a melt viscosity at relatively high shear rates. This limits the amount of very high molecular weight polymer present; otherwise, the extrusion step may be too difficult. On the other hand, one prefers that the low shear viscosity (sometimes also called the melt strength) of the polymer be high to avoid "sag." During and after parison formation, the parison is usually suspended for a short period from the extrusion die, and one does not want the parison to flow or deform significantly ("sag") before the actual molding step. High melt strength is often imparted by high molecular weight polymer. Therefore, polymers useful for blow molding often have a relatively small amount of a high molecular weight fraction present to impart good melt strength without making the high shear viscosity too high.

U.S. Pat. Nos. 6,214,761 and 6,297,338 describe the use of polymerization catalyst systems containing at least one iron complex of a bisimine of 2,6-diacylpyridine or a bisimine of a 2,6-pyridinedicarboxaldehyde and at least one other polymerization catalyst, which also may be an iron complex of a bisimine of 2,6-diacylpyridine or a bisimine of a 2,6-pyridinedicarboxaldehyde. No mention is made of the specific composition described herein or of its use to make polymers particularly useful in blow molding.

World Patent Application 01/15899 describes the use of polyethylenes made with iron complexes of a bisimine of 2,6-diacylpyridine or a bisimine of a 2,6-pyridinedicarboxaldehyde in blow molding. No mention is made of using a polyethylene prepared from a mixture of two such polymerization catalysts.

SUMMARY OF THE INVENTION

This invention provides a polymerization catalyst comprising:
  a.) a major portion of a first iron complex of a bisimine of 2,6-diacylpyridine or a bisimine of a 2,6-pyridinedicarboxaldehyde; and
  b.) a minor portion of a second iron complex of a bisimine of 2,6-diacylpyridine or a bisimine of a 2,6-pyridinedicarboxaldehyde, wherein under polymerization conditions the second iron complex produces a second polyolefin which has a higher weight average molecular weight than a first polyolefin produced by the first iron complex.

The invention also provides a process for the polymerization of olefins using an iron complex of a bisimine of 2,6-diacylpyridine or a bisimine of a 2,6-pyridinedicarboxaldehyde as part of a polymerization catalyst system, wherein the improvement comprises, using as part of the polymerization catalyst system:
  a.) a major portion of a first iron complex of a bisimine of 2,6-diacylpyridine or a bisimine of a 2,6-pyridinedicarboxaldehyde; and
  b.) a minor portion of a second iron complex of a bisimine of 2,6-diacylpyridine or a bisimine of a 2,6-pyridinedicarboxaldehyde, wherein under polymerization conditions the second iron complex produces a second polyolefin which has a higher weight average molecular weight than a first polyolefin produced by the first iron complex.

Also disclosed herein is a process for blow molding a mixture of polyolefins to form a hollow shaped article, comprising:
  a.) producing a mixture of polyolefins by contacting one or more olefins under polymerizing conditions with a polymerization catalyst system comprising:
    i.) a major portion of a first iron complex of a bisimine of 2,6-diacylpyridine or a bisimine of a 2,6-pyridinedicarboxaldehyde; and
    ii.) a minor portion of a second iron complex of a bisimine of 2,6-diacylpyridine or a bisimine of a 2,6-pyridinedicarboxaldehyde, wherein under polymerization conditions said second iron complex produces a second polyolefin which has a higher weight average molecular weight than a first polyolefin produced by said first iron complex;
  b.) melting said mixture of polyolefins to form a molten mixture of polyolefins; and
  c.) blow molding the molten mixture of polyolefins.

DETAILS OF THE INVENTION

Herein certain terms are used and some of them are defined below.

By a "major portion" of an iron complex herein is meant that iron complex is greater than 50 mole percent of the total of all such iron complexes present in the polymerization catalyst system.

By a "minor portion" of an iron complex herein is meant that iron complex is less than 50 mole percent of the total of all such iron complexes present in the polymerization catalyst system.

By a "polymer" herein is meant a polymeric material having an average degree of polymerization of at least about 50, preferably at least about 100, and more preferably about 200. By "average degree of polymerization" is meant the number of monomer (olefin) repeat units in the average polymer chain. A polymerization catalyst herein makes a polymer.

A "hydrocarbyl group" is a univalent group containing only carbon and hydrogen. If not otherwise stated, it is preferred that hydrocarbyl groups (and alkyl groups) herein contain 1 to about 30 carbon atoms.

By "substituted hydrocarbyl" herein is meant a hydrocarbyl group that contains one or more substituent groups which do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur. The free valence of the substituted hydrocarbyl may be to the heteroatom. In a substituted hydrocarbyl, all of the hydrogens may be substituted, as in trifluoromethyl.

By "(inert) functional group" herein is meant a group other than hydrocarbyl or substituted hydrocarbyl that is inert under the process conditions to which the compound containing the group is subjected. The functional groups also do not substantially interfere with any process described herein that the compound in which they are present may take part in. Examples of functional groups include halo (fluoro, chloro, bromo and iodo), and ether such —$OR^{30}$ wherein $R^{30}$ is hydrocarbyl or substituted hydrocarbyl. In cases in which the functional group may be near a transition metal atom (such as an iron atom), the functional group should not coordinate to the transition metal atom more strongly than the groups in those compounds which are shown as coordinating to the transition metal atom. That is, they should not displace the desired coordinating groups.

By "aryl" is meant a monovalent aromatic group in which the free valence is to the carbon atom of an aromatic ring. An aryl may have one or more aromatic rings that may be fused, or connected by single bonds or by other groups.

By "substituted aryl" is meant a monovalent aromatic group substituted as set forth in the above definition of "substituted hydrocarbyl". Similar to an aryl, a substituted aryl may have one or more aromatic rings which may be fused, or connected by single bonds or by other groups. However, when the substituted aryl has a heteroaromatic ring, the free valence in the substituted aryl group can be to a heteroatom (such as nitrogen) of the heteroaromatic ring instead of a carbon.

The polyolefins used herein are made by polymerizing one or more olefins using as part of the polymerization catalyst system two or more iron complexes of a 2,6-diacylpyridine or a diimine of a 2,6-pyridinedicarboxaldehyde. These iron complexes and their use as polymerization catalysts are described, for example, in U.S. Pat. No. 5,955,555 and WO 99/12981, or in WO 99/50273 (corresponding to U.S. patent application Ser. No. 09/277,910, filed 29 Mar. 1999) and WO 00/08034 (also incorporated by reference herein for all purposes as if fully set forth). Reference may be had thereto for further details regarding these catalyst complexes and the preparation thereof. A preferred olefin for polymerization with these catalysts is ethylene, either alone or with comonomers, particularly with one or more α-olefins such as 1-butene, 1-hexene, 1-pentene, 1-octene, etc. Homopolymerization of ethylene is preferred.

In one preferred form of the polymerization catalyst system, the iron tridentate complexes are supported on a solid particulate support. Many supports in general are known for transition metal containing polymerization catalysts, and most of these are suitable for this use. Such supports include silica, a combination of silica and montmorillonite, alumina, $MgCl_2$, various clays, and others. Silica is a preferred support. Methods for supporting such catalysts are known in the art; see for instance World Patent Applications 99/46303, 99/46304. 00/15646, 01/32722, 01/32723, and U.S. Pat. Nos. 6,214,761 and 5,955,555, all of which are hereby included by reference.

The process used for the polymerization may be any previously described in the literature for these types of polymerization catalysts, such as batch, semibatch or continuous. They may be gas phase (fluidized bed), liquid slurry or solution polymerizations. Other known process conditions, such as the temperature and/or the pressures previously described, may be used. Other ingredients, e.g., chain transfer agents such as hydrogen, may be used and/or be present.

In one form, a "2,6-pyridinedicarboxaldehydebisimine or a 2,6-diacylpyridinebisimine" is a compound of formula (I)

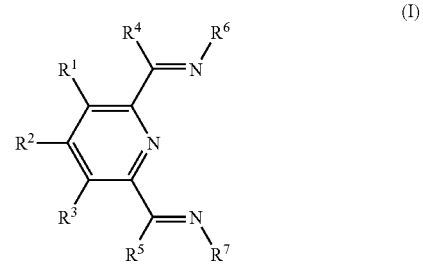

(I)

wherein: $R^1$, $R^2$, $R^3$, $R^4$ and $R^5$ are each independently hydrogen, hydrocarbyl, substituted hydrocarbyl, or an inert functional group; and $R^6$ and $R^7$ are aryl, substituted aryl, or a functional group.

Typically in the iron complexes of the 2,6-pyridinedicarboxaldehydebisimines or the 2,6-diacylpyridinebisimines, there is sufficient steric hindrance about the iron atom in the complex so that olefins may be polymerized. Steric hindrance is often provided in (I), at least in part, by $R^6$ and $R^7$. For example $R^6$ may be a phenyl ring of formula (II)

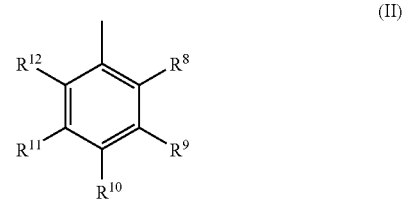

(II)

and $R^7$ may be a phenyl ring of formula (III)

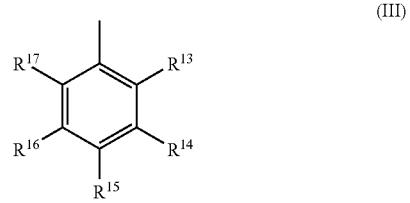

(III)

wherein $R^8$, $R^9$, $R^{10}$, $R^{11}$, $R^{12}$, $R^{13}$, $R^{14}$, $R^{15}$, $R^{16}$, and $R^{17}$ are each independently hydrogen, hydrocarbyl, substituted hydrocarbyl or a functional group. The substitution on the ortho positions of the phenyl rings, namely $R^8$, $R^{12}$, $R^{13}$ and $R^{17}$, is particularly important in determining the steric crowding about the iron atom.

This is important in the present case since the amount of such steric crowding is one way of controlling the molecular weight (under a given set of polymerization conditions) of the polyolefin produced.

Generally speaking the more sterically crowded the iron atom is, the higher the molecular weight, including the weight average molecular weight, of the polyolefin produced. See, for instance, B. L. Small, et al., *J. Am. Chem. Soc.*, 120, 4049–4050 (1998) and A. M. A. Bennett, *Chemtech*, 29 (7), 24–28 (1999), both of which are hereby included by reference. Particularly important in determining the steric crowding about the iron atom in the complexes when (II) and (III) are present are the 4 o-aryl positions, $R^8$, $R^{12}$, $R^{13}$, and $R^{17}$. In particular, the larger these groups are, the more sterically crowded the iron atom is. In an ethylene polymerization, if $R^8$, $R^{12}$, $R^{13}$, and $R^{17}$ are hydrogen, usually only low molecular weight polymers (oligomers) of ethylene are produced. If $R^8$, $R^{12}$, $R^{13}$, and $R^{17}$ are all methyl, a polyethylene is produced, while if $R^8$, $R^{12}$, $R^{13}$, and $R^{17}$ are all isopropyl, a still higher molecular weight polyethylene is produced.

The second polymerization catalyst herein produces a polyolefin which has a higher $M_w$ than the polyolefin produced by the first polymerization catalyst. Preferably, the $M_w$ of the second polymerization catalyst is 1.1 times, more preferably 1.2 times and especially preferably 1.5 times the $M_w$ of the polyolefin produced by the first polymerization catalyst. To determine the $M_w$ of the polyolefins produced by each of these catalysts, polyolefin is produced by each of the individual catalysts in a polymerization having conditions which are to be used for the combined (mixed) catalyst. The $M_w$s of each of these polyolefins is then measured (see below) and compared. For example, if both catalysts were to be used in a slurry polymerization using silica as a support, with hydrogen as a chain transfer agent, each catalyst would be supported individually on the support and an individual polymerization run with each catalyst under the process conditions used for the polymerization where both catalysts would be present. The $M_w$s of the polymers prepared by each of the individual catalysts would then be compared.

In the polymerization process (and consequently in the polymeric products) ethylene is a preferred olefinic monomer. Copolymerization of ethylene with α-olefins such as 1-butene, 1-pentene, 1-hexene, 1-octene etc. are also preferred, especially when ethylene-derived repeat units are at least about 80 mole percent, more preferably at least about 90 mole percent of the repeat units in the polyolefin product. Homopolymers of ethylene are especially preferred.

Generally speaking, it is believed that only a relatively small amount of the polymer derived from the second catalyst should be in the polymer product of the process. The exact relative amounts will depend on the relative amounts of the first and second polymerization catalysts present and on their relative polymerization rates. Preferably, the first polymerization catalyst will be at least about 75 mole percent, more preferably at least about 80 mole percent of the total of the iron complexes present. Preferably the first polymerization catalyst will also be no more than about 95 mole percent, more preferably no more than about 90 mole percent of the total of the first and second polymerization catalysts present. Any of the minimum amounts may be combined with any of these maximum amounts.

The polymer product produced by this process will often have a bimodal molecular weight distribution, with a lesser amount of higher molecular weight polymer in the bimodal distribution. Since one of these iron complexes individually sometimes produces a polymeric product which is itself bimodal with a relatively small amount of lower molecular weight polymer present, one could possibly produce trimodal or higher-modal polymers. It is preferred that the higher molecular weight polymer produced by the second polymerization catalyst is about 2 to about 25 weight percent of the polymer product, more preferably about 5 to about 20 weight percent of polymer product.

This polymerization process utilizing two similar but chemically different iron tridentate catalysts is particularly useful for producing polymer blends having a broad molecular weight distribution, and particularly having a higher molecular weight fraction (sometimes called a higher molecular weight "tail"). By using two chemically similar polymerization catalyst rather than two different types of catalysts (for example, an iron tridentate catalyst and a metallocene-type or Ziegler-Natta-type catalyst), polymerization conditions for the two polymerization catalysts present are more easily matched and controlled. For instance, if one wishes to use hydrogen for chain transfer to control polymer molecular weight, the iron tridentate catalysts generally require much higher hydrogen concentrations to achieve a given molecular weight reduction than either metallocene or Ziegler-Natta catalysts.

The polymer product of the polymerization process of this invention is particularly useful in all types of blow molding, and is particularly suited for extrusion blow molding. Blow molding is a well-known melt-forming process. See, for instance, H. Mark, et al., Ed., Encyclopedia of Polymer Science and Engineering, $2^{nd}$ Ed., Vol. 2, John Wiley & Sons, New York, 1985, p. 447–478, and N. C. Lee, Understanding Blow Molding, Hanser Publishers, Munich, 2000, both of which are hereby included by reference. The polymer product of the polymerization process of this invention has a broad molecular weight distribution, and a relatively large amount of lower molecular weight polymer and a relatively small amount of higher molecular weight polymer. This is a combination which has the desirable viscoelastic properties described above for blow molding.

What is claimed is:

1. A polymerization catalyst comprising:
   (a) a major portion of a first iron complex of a bisimine of 2,6-diacylpyridine or a bisimine of a 2,6-pyridinedicarboxaldehyde and which under polymerization conditions produces a polymer with an average degree of polymerization of at least about 50; and
   (b) a minor portion of a second iron complex of a bisimine of 2,6-diacylpyridine or a bisimine of a 2,6-pyridinedicarboxaldehyde, wherein under polymerization conditions the second iron complex produces a second polyolefin which has a higher weight average molecular weight than a first polyolefin produced by the first iron complex.

2. A process for the polymerization of olefins using an iron complex of a bisimine of 2,6-diacylpyridine or a bisimine of a 2,6-pyridinedicarbox-aldehyde as part of a polymerization catalyst system, wherein the improvement comprises, using as part of the polymerization catalyst system:
   (a) a major portion of a first iron complex of a bisimine of 2,6-diacylpyridine or a bisimine of a 2,6-pyridinedicarboxaldehyde which produces a polymer with an average degree of polymerization of at least about 50; and (b) a minor portion of a second iron complex of a bisimine of 2,6-diacylpyridine or a bisimine of a 2,6-pyridinedicarboxaldehyde, wherein under polymerization conditions the second iron complex produces a second polyolefin which has a higher weight average molecular weight than a first polyolefin produced by the first iron complex.

3. The process as recited in claim 2 wherein said olefin comprises ethylene.

4. The process as recited in claim 2 wherein said olefin is ethylene.

5. The product of the process of claim 2.

6. A process for blow molding a mixture of polyolefins to form a hollow shaped article, comprising:
(a) producing a mixture of polyolefins by contacting one or more olefins under polymerizing conditions with a polymerization catalyst system comprising:
  (i) a major portion of a first iron complex of a bisimine of 2,6-diacylpyridine or a bisimine of a 2,6-pyridinedicarboxaldehyde which produces a polyolefin with an average degree of polymerization of at least about 50; and
  (ii) a minor portion of a second iron complex of a bisimine of 2,6-diacylpyridine or a bisimine of a 2,6-pyridinedicarboxalde-hyde, wherein under polymerization conditions said second iron complex produces a second polyolefin which has a higher weight average molecular weight than a first polyolefin produced by said first iron complex;
(b) melting said mixture of polyolefins to form a molten mixture of polyolefins; and
(c) blow molding the molten mixture of polyolefins.

7. The process as recited in claim 6 wherein said polyolefin is a polyethylene.

8. The process as recited in claim 6 wherein said polyolefin is a homopolyethylene.

9. The process as recited in claim 6 wherein said process is an extrusion blow molding process.

* * * * *